United States Patent [19]

Gill

[11] Patent Number: 5,241,834
[45] Date of Patent: Sep. 7, 1993

[54] REFRIGERATION FLUID RECOVERY APPARATUS

[75] Inventor: Kenneth Gill, Sydenham, Canada

[73] Assignee: CFC-TEK Inc., Rexdale, Canada

[21] Appl. No.: 884,084

[22] Filed: May 18, 1992

[51] Int. Cl.$^5$ .............................................. F25B 49/00
[52] U.S. Cl. ............................................................ 62/292
[58] Field of Search ....................... 62/292, 149, 77, 85

[56] References Cited

U.S. PATENT DOCUMENTS

| | | | |
|---|---|---|---|
| 4,476,688 | 10/1984 | Goddard | 62/149 |
| 4,809,520 | 3/1989 | Manz et al. | 62/292 |
| 4,903,499 | 2/1990 | Merritt | 62/149 |
| 4,938,031 | 7/1990 | Manz et al. | 62/145 |
| 4,969,495 | 11/1990 | Grant | 141/98 |
| 4,981,020 | 1/1991 | Scuderi | 62/77 |
| 4,986,082 | 1/1991 | Tomaru | 62/149 |
| 4,998,413 | 3/1991 | Sato | 62/149 |
| 5,018,361 | 5/1991 | Kroll et al. | 62/85 |
| 5,024,061 | 6/1991 | Pfeil et al. | 62/77 |
| 5,033,271 | 7/1991 | Manz et al. | 62/125 |
| 5,038,578 | 8/1991 | Manz et al. | 62/292 |
| 5,040,382 | 8/1991 | Abraham | 62/470 |
| 5,058,631 | 10/1991 | Grant | 141/10 |
| 5,076,063 | 12/1991 | Kamegasawa et al. | 62/48.2 |

Primary Examiner—Albert J. Makay
Assistant Examiner—William C. Doerrler
Attorney, Agent, or Firm—Sixbey, Friedman, Leedom & Ferguson

[57] ABSTRACT

An apparatus adapted for recovering compressible refrigeration fluid from a refrigerator means and delivering the recovered fluid under high-pressure conditions along a line to a receptacle, in fluid communication and in sequence along the line. An accumulator means to which refrigeration fluid from the refrigerator means in gaseous form is drawn, a compressor to compress the refrigeration fluid from the accumulator and create a vacuum condition for drawing refrigeration fluid from the refrigerator means, and a condenser to liquify the refrigeration fluid for delivery to the receptacle, the improvement characterized by a secondary receptacle being provided, communicating with the line between the condenser and receptacle and with the line upstream of the accumulator, and a valve means in the line between the secondary receptacle and the compressor arranged, when the pressure in the secondary receptacle exceeds a predetermined value, so that the valve will open to allow some of the refrigeration fluid to flow back to the compressor for recondensation, to thereby lower the pressure in the receptacle.

12 Claims, 1 Drawing Sheet

REFRIGERATION FLUID RECOVERY APPARATUS

FIELD OF THE INVENTION

The present invention relates to an improved apparatus for recovering compressible refrigeration fluid from a refrigerator means.

BACKGROUND OF THE INVENTION

Apparatus has been developed for recovery of refrigeration fluid (refrigerant) from refrigerator systems such as air conditioners, refrigerators and the like, for delivering that recovered fluid to a receptacle such as a receiving cylinder (high-pressure) or drum (low-pressure). Such apparatus conventionally comprises an accumulator means to which refrigeration fluid from the refrigerator system is drawn in gaseous form. A compressor compresses the refrigerant from the accumulator and creates a vacuum condition for drawing refrigerant from the refrigerator system. A condenser liquifies the refrigerant from the accumulator for delivery of liquid refrigerant to the receptacle.

A problem with such apparatus is that, under higher temperature conditions in particular, the vapor pressure in the receiving cylinder increases to the point that either recovery is extremely slow or the recovery equipment must be shut down as pressure is too high. As well, the high pressure relief on the cylinder may "blow" to atmosphere since the pressure is too high. In this latter case, since most conventional refrigeration fluids are environmentally hazardous, it is unacceptable and in many jurisdictions illegal to have such apparatus which releases such gases to the atmosphere.

Solutions to such problems of high pressure refrigerant recovery apparatus have included switching the receiving cylinders (in which case much time is consumed and the result is cylinders which may be only partially full), waiting for the receiving cylinder to cool down, at which point the pressure will be accordingly reduced (again very time consuming) or cooling the receiving cylinder with water or ice (ice is seldom available, water is usually not available and a bath arrangement is needed in which to immerse the receiving cylinder).

Similar apparatus, used for instance in recovery of refrigeration fluid such as R11 (trade-mark) at low pressures, may use drums as the receptacles. The drums withstand only very low pressure when operating in association with such recovery apparatus. Thus, the vapor pressure in the drum must be monitored so that it does not increase to an unacceptable level. Again, in the past, venting of the drum to the atmosphere has been the conventional solution for reducing the vapor pressure build-up which may occur as the drum is being filled with recovered refrigeration fluid.

U.S. Pat. No. 4,981,020 of Scuderi issued Jan. 1, 1991 describes an apparatus for recovering a compressible refrigeration fluid from a refrigeration system which includes a safety tank for preventing over-filling of the receiver. The safety tank communicates directly with the receiver. So long as the safety tank receives refrigerant in the gas phase, the apparatus simply passes that refrigerant back to the compressor for return to the receiver. If however the receiver is filled, liquid refrigerant will pass to the safety tank, activating switches and valves to close down the recovery operation, thereby terminating the flow of refrigerant to the receiver. This apparatus however does not respond to high pressure conditions in the receiver, the safety tank merely being an overflow receptacle for liquid once the receiver has been filled.

Other references of general background interest relating to refrigerant recovery apparatus include U.S. Pat. Nos. 5,018,361 of Willikroll et al issued May 28, 1991, 5,058,631 of David C. H. Grant issued Oct. 22, 1991, 5,040,382 of Anthony W. Abraham issued Aug. 20, 1991, 5,038,578 of Manz et al issued Aug. 13, 1991, 5,033,271 of Manz et al issued Jul. 23, 1991, 5,024,061 of Pfeil et al issued Jun. 18, 1991, 4,998,413 of Sato et al issued Mar. 12, 1991, 4,938,031 of Manz et al issued Jul. 3, 1990, 4,903,499 of Thomas D. Merritt issued Feb. 27, 1990, and 4,809,520 of Manz et al issued Mar. 7, 1989.

SUMMARY OF THE INVENTION

In accordance with the present invention there is provided an improved apparatus adapted for recovering compressible refrigeration fluid from a refrigerator means and delivering the recovered fluid, under high or low pressure conditions, along a line to a receptacle. The apparatus comprises, in fluid communication and in sequence, an accumulator means to which refrigeration fluid from the refrigeration means is drawn in gaseous form, a compressor to compress the refrigeration fluid from the accumulator and create a vacuum condition for drawing refrigeration fluid from the refrigerator means, and a condenser to liquify the refrigeration fluid for delivery to the receptacle.

In one embodiment of the invention, particularly adapted for high pressure conditions (e.g. up to about 300 or 350 p.s.i.), the improvement is characterized by a secondary receptacle being provided, in line between the condenser and receptacle and communicating with the line upstream of the compressor, and a valve means in the line between the secondary receptacle and the compressor, arranged, when the vapor pressure in the secondary receptacle exceeds a predetermined value, so that the valve will open to allow some of the refrigeration fluid in the secondary receptacle and receptacle to flow back to the compressor for recondensation, thereby to lower the pressure in the receptacle.

In an alternative embodiment of the present invention, particularly suited for low pressure conditions (e.g. under about 25 to 30 p.s.i.) the improvement comprises an elongated tubing being provided, one end of the tubing communicating with the line at the receptacle and the other end communicating with the line upstream of the accumulator, and a pressure regulator associated with said tubing and arranged, when the pressure in the receptacle exceeds a predetermined value, so that the pressure regulator will cause some of the refrigeration fluid to flow through the tubing back to the line upstream of the accumulator thereby to reduce the pressure in the receptacle.

In both embodiments of the present invention described above, venting of refrigerant to the atmosphere when pressure conditions at the receptacle become critical is avoided. The apparatus of the present invention is simple to construct and fast and efficient in operation. For example, the need to cool the receptacle with water or ice is avoided since the apparatus according to the present invention enables the pressure in the receptacle to be quickly reduced, with a consequent reduction in temperature.

In essence, in both embodiments, applicants solution is similar: relief of the vapor pressure from the top of the receptacle, by removal of refrigerant fluid in gaseous form from the receptacle, but containment of the refrigerant fluid and recycling thereof through the apparatus. This allows liquid in the receptacle drum or cylinder, to "boil" and cools down the drum or cylinder, allowing more refrigerant liquid then to enter.

Thus, it is an object of the present invention to provide a refrigeration fluid recovery apparatus which is effective in controlling the vapor pressure in the receptacle and preventing that vapor pressure from becoming too high. It is a further object of the present invention to provide such an apparatus which will quickly and effectively relieve the vapor pressure from the cylinder but contain and recycle refrigeration fluid from the receptacle as the vapor pressure is being relieved. It is yet a further object of the present invention to provide such an apparatus which may be readily incorporated into a single unit, for ease of transportation and use.

BRIEF DESCRIPTION OF THE DRAWINGS

These and other objects and advantages of the invention will become apparent upon reading the following detailed description and upon referring to the drawings in which.

Figure 1:
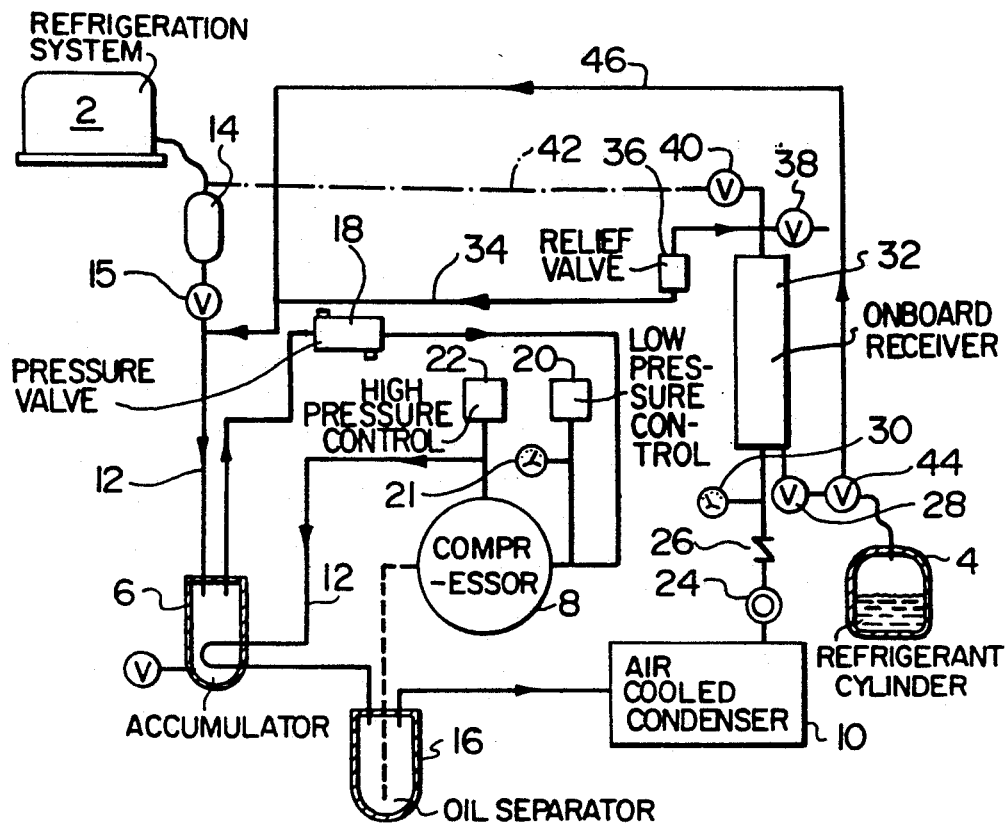
FIG. 1 is a schematic flow chart of an example embodiment of apparatus according to the present invention particularly suited to medium/high pressure operation (up to about 300 to 350 p.s.i.)

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a schematic flow chart of apparatus in accordance with the present invention, for recovering compressible refrigeration fluid from a refrigerator system 2 and delivering the recovered fluid along the lines, as illustrated, to a receptacle in the form of refrigerant cylinder 4. The apparatus as illustrated comprises essentially an accumulator 6, to which refrigeration fluid from refrigeration system 2 is delivered in gaseous form, a compressor 8 to compress refrigeration fluid from the accumulator 6, creating a vacuum condition for drawing refrigeration fluid from system 2, and an air cooled condenser 10 to liquify the refrigeration fluid for delivery to cylinder 4. It should be noted that line 12, from compressor 8, is passed through accumulator 6 where it acts as heat exchanger to boil refrigeration fluid which may still be in liquid form when it arrives at accumulator 6 from refrigeration system 2. Appropriate lines 12 extend, as illustrated, between these components of the apparatus, to permit flow of fluid as required. Preferably a filter/dryer 14 is located at the upstream end of the apparatus, on line 12, and an oil separator 16 is provided in the line between compressor 8 and condenser 10 to facilitate in purifying refrigeration fluid as it passes through the apparatus to refrigerant cylinder 4. Downstream of filter/dryer 14, before accumulator 6, is an inlet valve 15. The apparatus also incorporates a pressure valve 18, low pressure control 20, low pressure gauge 21 and high pressure control 22 associated with compressor 8. A liquid analyzer 24, check valve 26 and outlet valve 28 are provided in line 12 between condenser 10 and the end of line 12, where it connects to refrigerant cylinder 4. High pressure gauge 30, as illustrated, monitors the pressure in this portion of line 12.

In accordance with applicant's invention, this embodiment of apparatus incorporates an on-board, secondary receptacle in the form of on-board receiver 32. The volume of on-board receiver 32 is relatively small when compared to that of refrigerant cylinder 4. Thus, for example, a five (5) pound secondary receiver 32 may be suitably used, whereas receiver 4 may be for instance a thirty (30) pound or fifty (50) pound receiver. The ratio of the volume of the receiver 32 to that of receiver 4 is preferably in the range of about 1:5 to 1:20. Positioned in the line between condenser 10 and refrigerant cylinder 4, this on-board receiver also communicates, through line 34, with line 12 upstream from accumulator 6, as illustrated. In addition, relief valve 36 is provided in line 34, as illustrated, as well as safety valve 38 and recycle valve 40 (the latter for an optional line 42 communicating with line 12 upstream from filter/dryer 14).

Also forming part of the illustrated embodiment of apparatus according to the present invention is a three-way by-pass valve 44, and by-pass line 46, which communicates with line 34, downstream of relief valve 36.

In operation, during normal operation, the refrigeration fluid is liquified in condenser 10, and passes through liquid analyzer 24, check valve 26, on-board receiver 32, outlet valve 28 and three-way by-pass valve 44, to end up in the receiving cylinder 4.

When pressure in cylinder 4 however increases to a predetermined value, relief valve 36 in line 34 opens to allow some of the refrigerant fluid, in the gas state, back into the apparatus, upstream of accumulator 6, to be recondensed. This however may not entirely solve the problem. Since the pressure in cylinder 4 can increase faster than relief valve 36 can relieve it, it may be necessary to additionally turn off inlet valve 15 (optional) and turn off outlet valve 28. Three-way by-pass valve 44 is then turned so as to cut off refrigerator fluid flow at valve 28 and allow high pressure refrigerant vapor from receiving cylinder 4 to exit and travel rapidly, through line 46, to the line 12 at the beginning of the apparatus, where the fluid is at a considerably lower pressure, for recycling through the apparatus. Refrigeration fluid gas, returned to the upstream end of line 12, then becomes recondensed and accumulates as a liquid in secondary receiver 32. The receiving cylinder 4 is thus permitted to cool down and the recovery operation continues without delay. The liquid refrigerant accumulated in secondary receiver 32 is then dumped into the receiving cylinder 4. The receiving cylinder 4 can then be filled to its appropriate level (80%).

The apparatus according to this embodiment is a medium/high pressure apparatus, e.g. it handles R12 (trade-mark) refrigerant which "boils" at about $-20°$ F. or R22 (trade-mark) refrigerant which boils at about −40° F. The apparatus operates from about 20 inches vacuum to about 300 p.s.i.

Figure 2:
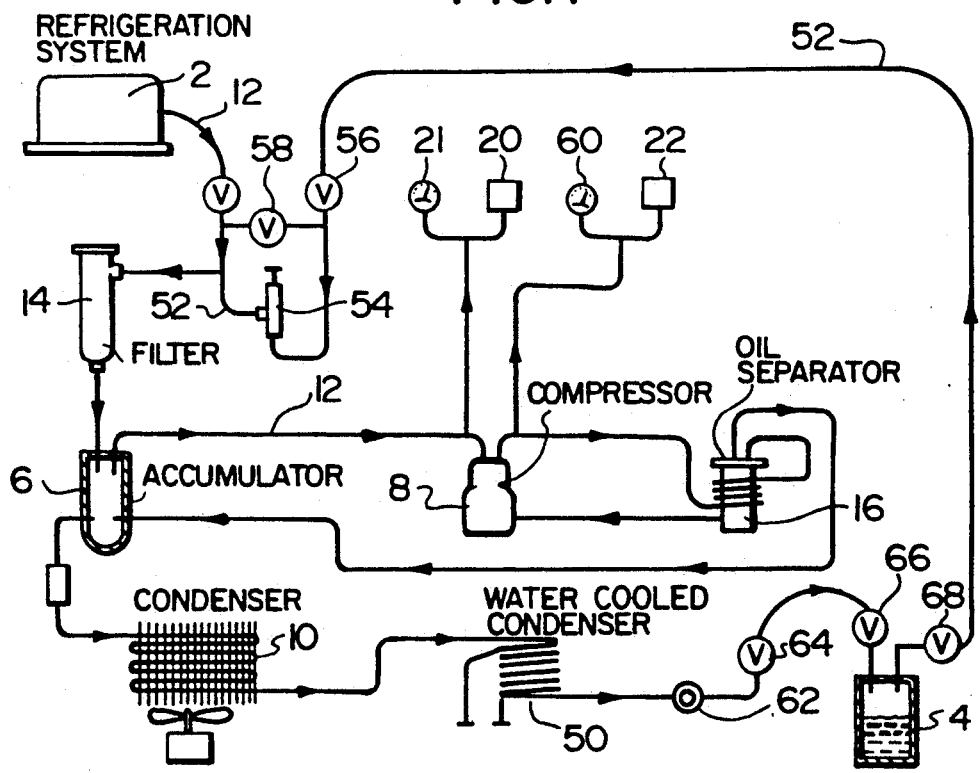
FIG. 2 is a schematic flow chart of a further example embodiment of apparatus according to the present invention particularly suited to low pressure apparatus (up to about 25 p.s.i.).

Turning to the alternative embodiment illustrated in the schematic flow chart of FIG. 2, this is a low pressure apparatus, e.g. it handles R11 (trade-mark) refrigerant which boils at about 75° F. The apparatus operates from about 28 inches vacuum to about 25 p.s.i. Instead of receiver 4 being a cylinder, it is conventionally a drum which withstands only very low pressures. When operating conventional recovery apparatus, the vapor pressure in the drum increases to an unacceptable level.

It will be noted that most of the main components of the apparatus of FIG. 2 correspond to those of the apparatus of FIG. 1. In addition to air cooled condenser 10 there is a water-cooled condenser 50. In this case, however, in order to relieve vapor pressure from the top of the drum forming receiver 4, and to contain and recycle refrigerant in the gas state from the drum through the apparatus, there is a return line 52 from receptacle 4 to deliver refrigerant fluid (gas) upstream of accumulator 6. As well, incorporated in line 52 is a pressure regulator 54 and a return valve 56. When return valve 56 is opened, and the pressure in receptacle 4 exceeds a predetermined value established at pressure regulator 54, that pressure regulator acts as an automatic valve to permit refrigerant gas to flow through line 52 back to accumulator 6. A further by-pass valve 58, in parallel with pressure regulator 54, between line 52 and line 12 as indicated, is provided to by-pass regulator 54 when the recovery of refrigerant gas is complete. This relieves the balance of excess pressure in receiver 4, and that receiver is then ready to be transported.

Of note, the apparatus illustrated in FIG. 2 additionally incorporates a high pressure gauge 60, associated with high pressure control 22 and line 12 upstream of compressor 8, as illustrated, liquid refrigerant flow sight glass 62, discharge valve 64 and conventional on-off valves 66 and 68.

Because of the differences between the high and low pressure situations, as described previously, the apparatus according to the present invention differs somewhat in detail, from one situation to the other. The problem being solved however is the same:
e.g. a high pressure cylinder may contain only one inlet port. Therefore a three-way valve 44 is used.
 in the low pressure apparatus, all of the excess pressure from drum receiver 4 can be relieved, at the conclusion of the recovery operation, simply by using by-pass valve 58, so that the drum can be shipped without pressure;
 in the high pressure apparatus of FIG. 1, an on-board secondary receiver 32 is used to accomplish greatly improved cooling at cylinder 4, when liquid refrigerant is accumulated in secondary receiver 32 and not returned directly to the receiving cylinder.

Thus it is apparent that there has been provided in accordance with the invention that fully satisfies the objects, aims and advantages set forth above. While the invention has been described in conjunction with a specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In an apparatus adapted for recovering compressible refrigeration fluid from a refrigerator means and delivering the recovered fluid under high-pressure conditions along a line to a receptacle, in fluid communication and in sequence along the line, an accumulator means to which refrigeration fluid from the refrigerator means in gaseous form is drawn, a compressor to compress the refrigeration fluid from the accumulator and create a vacuum condition for drawing refrigeration fluid from the refrigerator means, a condenser to liquify the refrigeration fluid, and a receptacle for receiving the liquified fluid, the improvement characterized by a secondary receptacle being provided, communicating with the line between the condenser and receptacle, a secondary line provided from the secondary receptacle communicating with the line upstream of the accumulator, and a valve means in the secondary line arranged, when the pressure in the secondary receptacle exceeds a predetermined value, so that the valve will open to allow some of the refrigeration fluid to flow back to the compressor for recondensation, to thereby lower the pressure in the receptacle.

2. An apparatus according to claim 1 wherein an outlet valve is provided in the line between the receptacle and the secondary receptacle, when closed said outlet valve cutting off flow of refrigeration fluid to the receptacle and causing it to flow back to the compressor through the secondary receptacle.

3. An apparatus according to claim 2 wherein a three-way valve is provided in the line between the outlet valve and the receptacle and a third line is provided from said three-way valve communicating with said line of the apparatus upstream of the accumulator, closing said outlet valve and opening of said three-way valve during high pressure conditions in the receptacle to cause said third line to be in communication with said receptacle causing fluid from the receptacle rapidly to flow back to the beginning of the line of the apparatus, thereby causing rapid lowering of the pressure in the receptacle.

4. An apparatus according to claim 1 further provided with an oil separator in the line between the compressor and the condenser.

5. An apparatus according to claim 3 further provided with an oil separator in the line between the compressor and the condenser.

6. An apparatus according to claim 1 further provided with a high pressure gauge communicating with the line between the condenser and the receptacle to provide a reading of the pressure in the receptacle during operation of the apparatus.

7. An apparatus according to claim 3 further provided with a high pressure gauge communicating with the line between the three-way valve and the receptacle to provide a reading of the pressure in the receptacle during operation of the apparatus.

8. An apparatus according to claim 1 wherein the condenser is an air-cooled condenser.

9. An apparatus according to claim 1 wherein the ratio of the volume of the secondary receptacle to that of the receptacle is a value selected from the range of between 1:5 to 1:20.

10. In an apparatus adapted for recovering compressible refrigeration fluid from a refrigerator means and delivering the recovered fluid under low pressure conditions along a line to a receptacle, the apparatus comprising in fluid communication and in sequence along the line, an accumulator means to which refrigeration fluid from the refrigerator means in gaseous form is drawn, a compressor to compress the refrigeration fluid from the accumulator and create a vacuum condition for drawing refrigeration fluid from the refrigerator means, a condenser to liquify the refrigeration fluid, and a receptacle for receiving the liquified fluid from the condenser, the improvement characterized by a tubing being provided, one end of the tubing communicating with the line at the receptacle and the other end communicating with the line upstream of the accumulator, and a pressure regulator associated with said tubing and arranged, when the pressure in the receptacle exceeds a predetermined value, so that the pressure regulator will cause some of the refrigerator fluid to flow through the tubing back to the line upstream of the accumulator thereby to reduce the pressure in the receptacle.

11. An apparatus according to claim 10 wherein the receptacle is a drum and pressure conditions, at the drum, during operation of the apparatus are in the order of 20 p.s.i.

12. An apparatus according to claim 9 wherein a by-pass valve is provided in parallel with the pressure regulator, the by-pass valve operable to allow flow of refrigeration fluid through the tubing from the receptacle to the line upstream of the accumulator, thereby to relieve the pressure in the receptacle.

* * * * *